United States Patent
Schenkein (10) Patent No.: US 12,013,967 B2
(45) Date of Patent: *Jun. 18, 2024

(54) METHODS AND SYSTEMS FOR ADAPTING AN APPLICATION PROGRAMMING INTERFACE

(71) Applicant: Capital One Services, LLC, McLean, VA (US)

(72) Inventor: Scott Schenkein, Midlothian, VA (US)

(73) Assignee: Capital One Services, LLC, McLean, VA (US)

(*) Notice: Subject to any disclaimer, the term of this patent is extended or adjusted under 35 U.S.C. 154(b) by 132 days.

This patent is subject to a terminal disclaimer.

(21) Appl. No.: 17/732,650

(22) Filed: Apr. 29, 2022

(65) Prior Publication Data

US 2022/0327236 A1 Oct. 13, 2022

Related U.S. Application Data

(63) Continuation of application No. 16/855,512, filed on Apr. 22, 2020, now Pat. No. 11,321,483, which is a continuation of application No. 16/419,844, filed on May 22, 2019, now Pat. No. 10,664,615.

(51) Int. Cl.
*H04L 9/40* (2022.01)
*G06F 21/62* (2013.01)
*H04L 67/01* (2022.01)

(52) U.S. Cl.
CPC ...... *G06F 21/6245* (2013.01); *H04L 63/0281* (2013.01); *H04L 63/0442* (2013.01); *H04L 67/01* (2022.05)

(58) Field of Classification Search
CPC . G06F 21/6245; H04L 67/01; H04L 63/0281; H04L 63/0442
See application file for complete search history.

(56) References Cited

U.S. PATENT DOCUMENTS

| | | | |
|---|---|---|---|
| 7,783,613 B2* | 8/2010 | Gupta | H04L 67/5651 707/693 |
| 8,276,186 B2* | 9/2012 | DeFord | G06F 21/6218 726/28 |
| 9,021,135 B2 | 4/2015 | Ang et al. | |
| 9,241,004 B1 | 1/2016 | April | |
| 9,294,594 B2 | 3/2016 | Koo | |

(Continued)

FOREIGN PATENT DOCUMENTS

WO 2017161403 A1 9/2017

*Primary Examiner* — Ghodrat Jamshidi
(74) *Attorney, Agent, or Firm* — Bookoff McAndrews, PLLC (57) ABSTRACT

A computer-implemented method for adapting an application programming interface (API), according to some embodiments, includes: determining that a data field of API response data satisfies a condition for applying a data security operation to data stored in the data field; and modifying the API response data by performing the data security operation on the data stored in the data field. A computer-implemented method for adapting an application programming interface (API), according to some embodiments, includes: determining that a data field of an API call satisfies a condition for applying a data security operation to data stored in the data field; and performing the data security operation on the data stored in the data field of the API call.

20 Claims, 6 Drawing Sheets

(56) References Cited

U.S. PATENT DOCUMENTS

| | | | |
|---|---|---|---|
| 9,898,610 B1 | 2/2018 | Hadsall | |
| 10,148,493 B1 * | 12/2018 | Ennis, Jr. | H04L 61/5014 |
| 10,194,001 B1 * | 1/2019 | Gardiner | H04L 67/10 |
| 10,216,449 B1 * | 2/2019 | Li | G06F 11/1451 |
| 10,769,000 B1 * | 9/2020 | Plunk | G06F 9/44536 |
| 10,824,588 B2 * | 11/2020 | Ramamurthy | H04L 69/08 |
| 2002/0099952 A1 | 7/2002 | Lambert et al. | |
| 2003/0031165 A1 | 2/2003 | O'Brien, Jr. | |
| 2004/0003412 A1 | 1/2004 | Halbert | |
| 2004/0064351 A1 | 4/2004 | Mikurak | |
| 2005/0228984 A1 | 10/2005 | Edery et al. | |
| 2007/0050871 A1 | 3/2007 | Mashhour | |
| 2008/0256205 A1 * | 10/2008 | Mahoney | G06F 15/16 709/227 |
| 2010/0290600 A1 | 11/2010 | Agranovsky et al. | |
| 2011/0307710 A1 | 12/2011 | McGuire et al. | |
| 2014/0032219 A1 | 1/2014 | Lerner et al. | |
| 2014/0115710 A1 | 4/2014 | Hughes et al. | |
| 2015/0215305 A1 | 7/2015 | Wetzel et al. | |
| 2016/0014076 A1 * | 1/2016 | Hansen | H04L 63/02 726/11 |
| 2016/0088023 A1 | 3/2016 | Handa et al. | |
| 2016/0335451 A1 | 11/2016 | Sinor | |
| 2017/0126677 A1 * | 5/2017 | Kumar | H04L 63/0227 |
| 2017/0169212 A1 | 6/2017 | Bello et al. | |
| 2017/0220798 A1 | 8/2017 | Madou et al. | |
| 2018/0152418 A1 | 5/2018 | Tableman | |
| 2018/0278471 A1 * | 9/2018 | Burli | G06F 9/451 |
| 2018/0365140 A1 * | 12/2018 | Bates | G06F 9/451 |
| 2019/0036678 A1 | 1/2019 | Ahmed | |
| 2019/0050380 A1 | 2/2019 | Wetzel et al. | |
| 2019/0081982 A1 * | 3/2019 | Breton | H04L 63/145 |
| 2019/0114417 A1 | 4/2019 | Subbarayan et al. | |
| 2020/0236187 A1 * | 7/2020 | Tal | H04L 63/0281 |

\* cited by examiner

METHODS AND SYSTEMS FOR ADAPTING AN APPLICATION PROGRAMMING INTERFACE

CROSS-REFERENCE TO RELATED APPLICATION(S)

This patent application is a continuation of U.S. Nonprovisional patent application Ser. No. 16/855,512, filed Apr. 22, 2020, which is a continuation of and claims the benefit of priority to U.S. Nonprovisional patent application Ser. No. 16/419,844, filed on May 22, 2019, now U.S. Pat. No. 10,664,615, the entireties of all of which are incorporated herein by reference.

TECHNICAL FIELD

Various embodiments of the present disclosure relate generally to controlling inputs and outputs of an application programming interface (API), and relate particularly to methods and systems for adapting APIs.

BACKGROUND

An application programming interface (API) is often designed based on certain security assumptions. However, security assumptions may change over time. For example, an API designed for usage within a private network may later be deployed to provide services to public clients, or new compliance requirements governing data input or output by the API may arise. In such scenarios, rewriting the existing API to accommodate new security or compliance requirements may be costly and may cause disruption of existing usage of the API. Additionally, building field-level security considerations into applications in a non-centralized manner may lead to inconsistent solutions with difficult-to-assess levels of security. Additionally, field-level security tends to require specialized security skills that might not be readily available.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure methods, systems, and non-transitory computer-readable media are disclosed for adapting application programming interfaces. Each of the examples disclosed herein may include one or more of the features described in connection with any of the other disclosed examples.

In one example, a computer-implemented method for adapting an application programming interface (API) may include receiving, from a client computer system, an API call for requesting information from a server. The method may further include calling an API of the server to request the information, and receiving, from the server, API response data including a data field storing data. Additionally, the method may include determining that the data field of the API response data satisfies a condition for applying a data security operation to the data stored in the data field, modifying the API response data by performing the data security operation on the data stored in the data field, and sending, to the client computer system, the modified API response data.

In another example, a computer-implemented method for adapting an application programming interface (API) may include receiving, from a client computer system, an API call requesting information from a server, and determining that a data field of the API call satisfies a condition for applying a data security operation to data stored in the data field. Additionally, the method may include performing the data security operation on the data stored in the data field of the API call to obtain processed data, and based on the API call, generating a second API call for requesting the information stored on the server, the second API call including the processed data. Further, the method may include sending the second API call to the server, retrieving, from the server, API response data generated by the server in response to the second API call, and sending, to the client computer system, the API response data or a modification of the API response data.

In another example, a computer system for adapting an application programming interface (API) may include a memory storing instructions and configuration data specifying a data field identifier and a data security operation to be applied to data in a data field having the data field identifier. Additionally, the system may include one or more processors configured to execute the instructions to perform operations. The operations may include receiving, from a client computer system, an API call requesting information from a server, calling an API of the server to request the information, receiving, from the server, API response data including an API response data field storing data, determining that the API response data field has an identifier matching the data field identifier specified in the configuration data, modifying the API response data by performing the data security operation on the data stored in the data field, and sending, to the client computer system, the modified API response data.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

The terminology used in this disclosure is to be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "computer system" generally encompasses any device or combination of devices, each device having at least one processor that executes instructions from a memory medium. Additionally, a computer system may be included as a part of another computer system.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In general, the present disclosure provides methods and systems for adapting an existing application programming interface (API). As will be discussed below in more detail, in methods and systems according to the present disclosure, the existing API may be adapted by using an API service adapter that rewrites the input and outputs of the existing API. The API service adapter therefore provides a "bolt-on" adapter that can adapt the existing API to various security formats and security requirements for the input and output of the API.

Figure 1A:
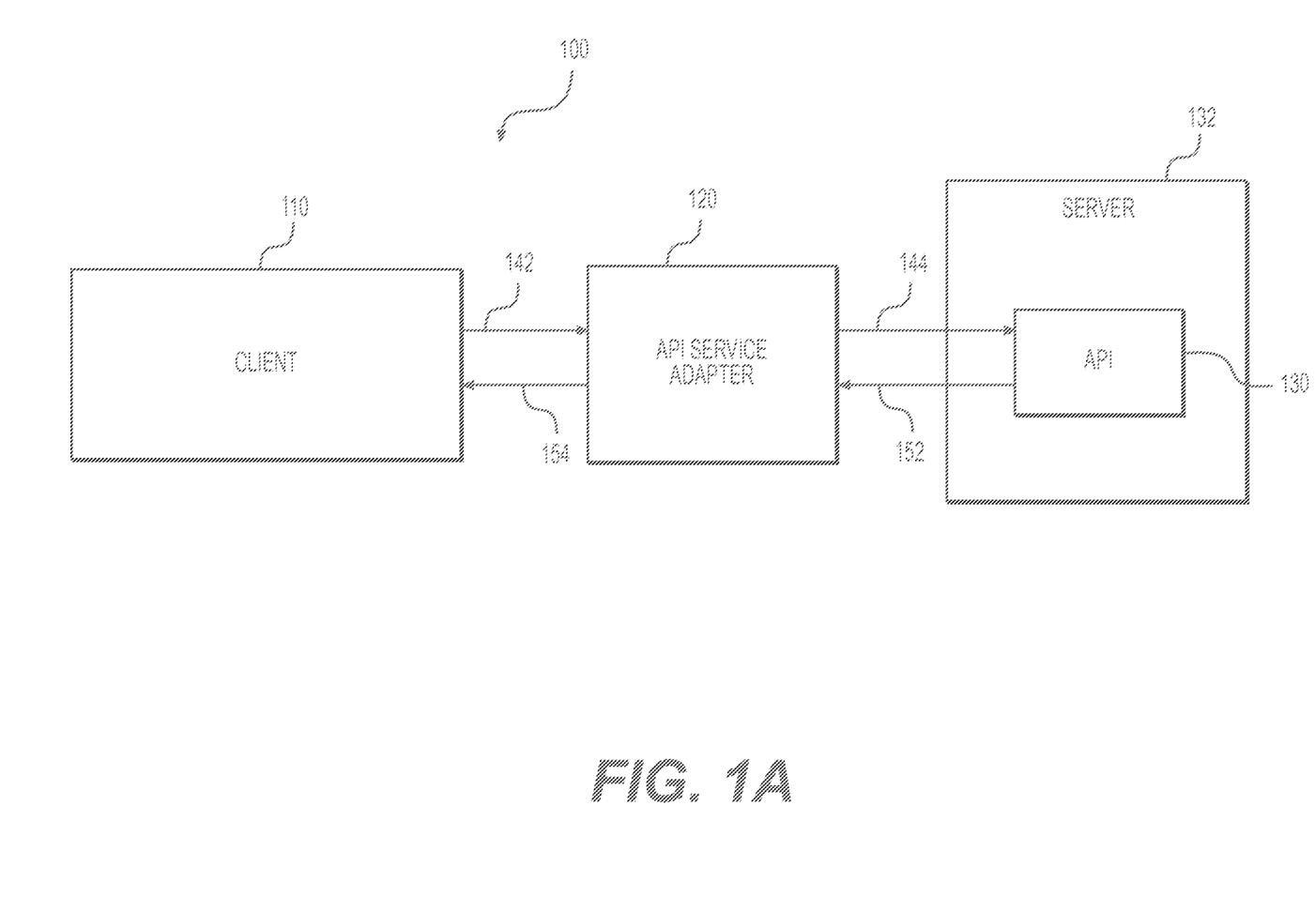
FIG. 1A depicts a client-server environment, according to one or more embodiments.

FIG. 1A illustrates a client-server environment 100 according to the present disclosure. The environment 100 may include a client 110, an API service adapter 120, and a server 132. The server 132 may provide a service through an API 130 of the server 132. This service provided through API 130 also may be referred to as an API service.

The server 132 may, for example, be a computer system or be implemented by a computer system. As mentioned above, the server 132 may offer a service through the API 130. For example, the server 132 may provide data or information in response to a request received by the server 132 through the API 130. Such requests may be referred to as API calls or API requests. The data or information provided by the server 132 may be stored in a memory, database, or other data storage that is part of the server 132, and may be retrieved by the server 132 in response to the request. However, it is also possible for the data or information provided by the server 132, or portions thereof, to be stored at a location external to the server, in which case the server 132 may first retrieve the data or information from another source before providing the data or information to the requesting party. The API 130 may, for example, be a REST or SOAP API, and return information in JSON or XML format. In some embodiments, the server 132 may be a web server or an application server.

The client 110 may, for example, be a computer system, which may be referred to as a client computer system or a client system. Referring to FIG. 1A, in order for the client 110 to access the service provided by the server 132, the client 110 may send an API call 142, which may be received by the API service adapter 120. The API service adapter 120, in response to receiving request 142, may send an API call 144 to the API 130. Depending on the particular implementation or circumstances, the payload of the API call 144 (e.g., data of interest contained within the API call 144) may be the same (e.g., identical) as the payload of the API call 142 (e.g., data of interest contained within the API call 142). For example, the API call 144 may be the same as the API call 142 except for the address to which the call is directed. Instead of passing the payload through, the API service adapter 120 may instead modify the payload of API call 142 to generate the API call 144 that is subsequently submitted to, and received by, the API 130. In such a situation, the API call 144 may be referred to as a modified (or rewritten) API call. The modification of the payload of the API call 142 also may be referred to as the rewriting of the input of the API 130.

API calls 142 and 144 may request certain information, in which case the API calls 142 and 144 may be referred as API calls for requesting information. This information may be any information provided by the API 130 of the server 132. The information may, for example, be sensitive information. In general, sensitive information may include account numbers, such as a primary account number (PAN), credit card number, and/or a deposited account ID. Sensitive information also may include personal identifiers, such as an ID number, a social security number, or a social insurance number. Other examples of information that may be requested from the server 132 include credit card or account balances, account transactions, etc.

The API calls 142 and 144 may likewise include sensitive information or other information. For example, in order to request an account balance from the API 130, the API call 144 may need to supply a primary account number, which may be sensitive information. As another example, the API call 142 may include information to be used by the API service adapter 120, such as for encryption or decryption.

The sever 132, in response to receiving the API call 144 through API 130, may generate and return API response data 152 to the API service adapter 120 through the API 130. It is noted that the term "API response data" is used to broadly refer to any data returned by the server 132 through the API 130. The API service adapter 120, in response to receiving the API response data 152, may transmit API response data 154 to the client 110. Depending on the particular implementation or circumstances, the API service adapter 120 may modify the payload of the API response data 152 returned by the API 130 to generate the API response data 154, in which case API response data 154 may be referred to as a modified (or rewritten) API response data. In this case, the modification of the API response data 152 is the data received by the client 110. Alternatively, the API response data 152 may pass through the API service adapter 120 as API response data 154 without modification to its payload.

The modification of the payload API response data 152 may be referred to as the rewriting of the output of the API 130. In various implementations, either the output or input of the API 130, or both or neither, may be modified. Such modification may include the application of a data security operation, discussed below in more detail.

The API service adapter 120 may be implemented by a gateway or a proxy included in the gateway. The API service adapter 120 may operate as a filter that modifies the contents (e.g., payloads) of the API response data 152 by applying one or more security operations to a field included in the API response data 152. Thus, the API service adapter 120 also may be referred to as a filtering API.

A security operation may be an operation that increases the security level of processed data, or an operation that decreases the security level of processed data. Examples of operations that increase the security level include tokenization, field masking, field redaction (e.g., removal of the field), truncation, and encryption. Examples of operations that decrease the security level include detokenization and decryption.

The API service adapter 120 may perform security operations on specific fields of the API response data 152. The API service adapter 120 may be configured to recognize those specific fields of the API response data 152, and apply one or more security operations specified for those fields. For example, the API service adapter may be configured to evaluate each field included in the API response data 152 to determine whether the field satisfies a condition (e.g., having a certain identifier, such as a field name). When a field in the response data 152 satisfies the condition, the API service adapter may perform an associated data security operation (or plurality of data security operations) on the content stored in that field. The specified condition and the specified security operation may be associated with each other by a configuration of the API service adapter 120. For example, the configuration may specify a condition of a field having the name "ssn" and associate this condition with performing a tokenization operation on any field satisfying the condition. The configuration of the API service adapter 120 is discussed in more detail below.

The API service adapter 120 also may apply one or more data security operations on the API call 142, and may do so on a field-by-field basis. That is, the API service adapter 120 may be configured to identify certain fields in the API call 142 that satisfy a specified condition (e.g., having a certain identifier, such as a field name), and apply an associated data security operation to those identified fields. The data security operation may be of any of the types mentioned earlier, including data security operations that increase or decrease the security level of data.

Therefore, the API service adapter 120 is configured to modify (e.g., rewrite) inbound and/or outbound payloads at the endpoints of API 130. In doing so, the API service adapter 120 may, for example, replace any raw sensitive information with encrypted values, values tokenized using an external tokenization service, masked values, or remove the values entirely.

Figure 1B:
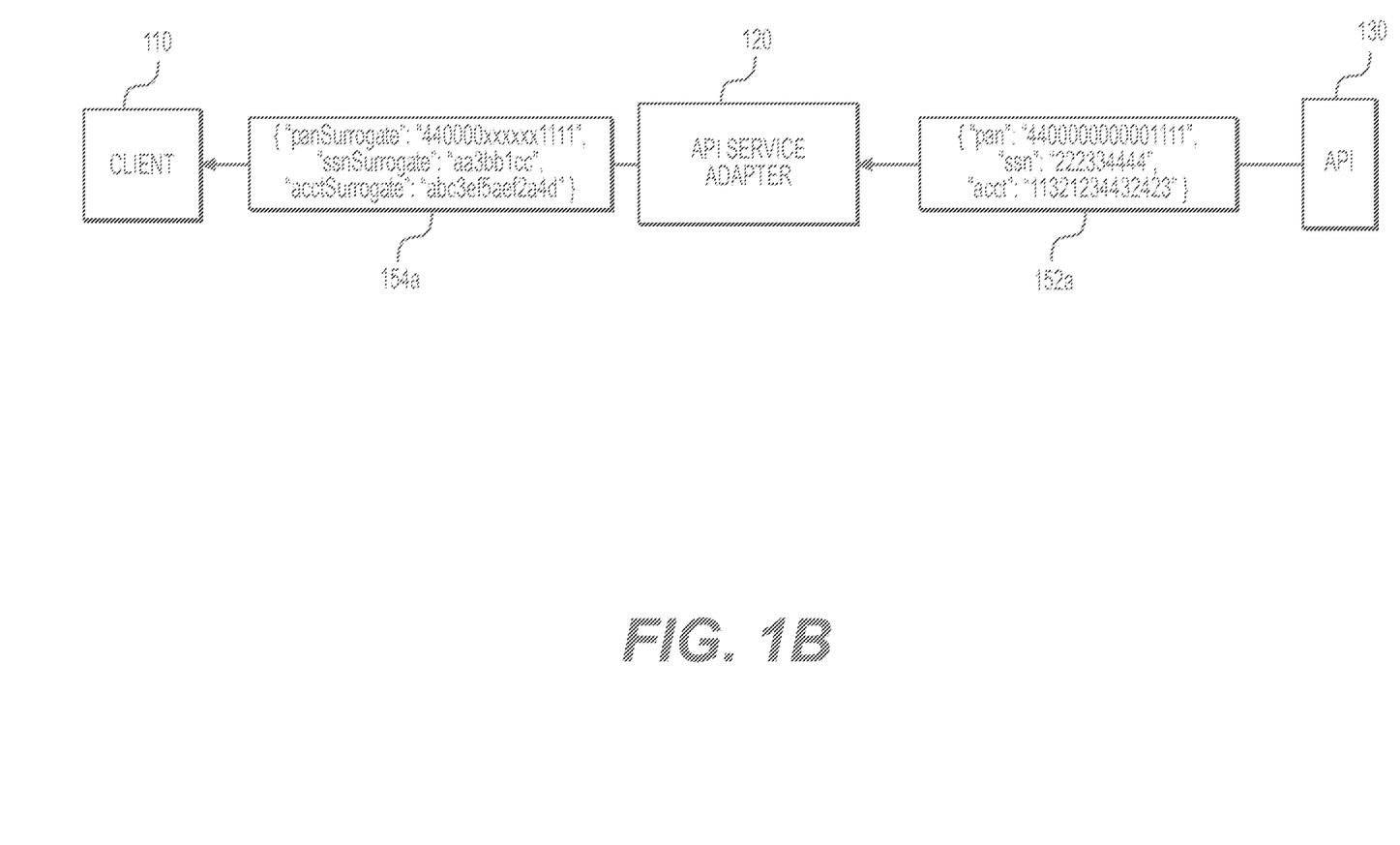
FIG. 1B depicts an example of data flow in a portion of the client-server environment of FIG. 1A, according to one or more embodiments.

FIG. 1B illustrates an example of part of the data flow depicted in FIG. 1A. FIG. 1B particularly illustrates an example of the API service adapter 120 performing a data security operation to modify the payload of API response data 152A, in order to generate modified API response data 154A that is sent to the client 110. API response data 152A and 154A in FIG. 1B are examples of API response data 152 and 154 of FIG. 1A, respectively.

As shown in FIG. 1B, the API response data 152A that is received by the API service adapter 120 includes a plurality of fields ("pan", "ssn", and "acct") respectively storing a primary account number, a social security number, and an account ID number in unencrypted, plaintext format. The primary account number, social security number, and account ID number, may be sensitive information that is provided as part of the API service offered by the server 132. In the instant example, the "pan", "ssn", and "account" fields, and their respective content, are included in the API response data 152A as respective key-value pairs of a JSON object. That is, a JSON object key (e.g., "ssn") is an example of a field, and the value of the key (e.g., "222334444" is a value) is an example of data or content stored in the field.

As shown in FIG. 1B, the API service adapter 120 filters the API response data 152A so as to replace the values of the fields with secured values. In the instant example, a tokenization operation is performed in which the numbers stored in the "ssn" and "account" fields are replaced by tokens, and a field masking operation is performed in which the part of the number stored in the "pan" field are masked by placeholder characters. The modified API response data 154A is then transmitted to the client 110. In addition to modifying the data stored in the fields, the API service adapter may modify the names of the fields. As shown in FIG. 1B, in the modified API response data 154A, the field name "pan" has been changed to "panSurrogate."

In general, API service adapter 120 may accept inputs and generate outputs in a variety of different formats, and may switch format between input and output. For example, the API response data 152A received by the API service adapter 120 may be in an XML format, in which case the fields recognized by the API service adapter 120 may be denoted by the XML element name. The API service adapter 120 may be configured to recognize fields based on other criteria. For example, in the case of XML data, an attribute of an XML element name may be recognized as a field. Additionally, a field may be included as data of another field, and the content of a field may include multiple sub-fields.

Referring back to FIG. 1A, the gateway or proxy implementing the API service adapter 120 may be a computer system or part of another computer system. In particular, the API service adapter 120 may, for example, be a Docker-based application that is configured, managed, and deployed within an approved scanning vendor (ASV) for which the API service adapter 120 produces services. Multiple instances of the API service adapter 120 may be deployed in a decentralized manner.

In some implementations, the API service adapter 120 and the server 132 may be part of a first computer system, and the client 110 may be part of a second computer system. In such implementations, communication between the client 110 and the API service adapter 120 may pass through a public network such as the internet, in which case the proxy implementing the API service adapter 120 may be referred to as a reverse proxy. In other implementations, the API service adapter 120 and the client 110 may be part of a first computer system, and the server 132 may be part of a second computer system. In such implementations, communication between the server 132 and the API service adapter 120 may pass through a public network such as the internet, in which case the proxy implementing the API service adapter 120 may be referred to as a forward proxy. In other implementations, the client 110, the API service adapter 120, and the server 132 may all be part of the same computer system or private network. In other implementations, the client 110, the API service adapter 120, and the server 132 may each be on a separate respective computer system or network.

Additionally, the client 110 and server 132 may switch roles while still utilizing the API service adapter 120 as an intermediary. For example, the server 132 may send an API call to the client 110 to request information from the client; this API call from the server 132 and/or the response from the client 110 may be modified by the API service adapter 12. The client 110 or the server 132 also may have different roles in other client-server relationships. For example, the server 132 may have the role of a client in interacting with another server (e.g., a backend server) through the API service adapter 120 or through another implementation of the API service adapter 120.

The API service adapter 120 may operate based on a specified configuration stored in the computer system implementing the API service adapter 120. The configuration may specify one or a plurality of services, each service specifying a set of operations of the API service adapter 120. For each service, the configuration may define the following attributes of the service: (1) the URI (e.g., URL) pattern that the service is invoked on, which may be a URI pattern to which the API service adapter 120 listens; (2) the URI (e.g., URL) of the API 130 to which requests are sent; (3) the type or format of the payload (e.g., XML or JSON); (4) authentication mechanisms of the API 130 (e.g., oAuth, client-TLS); and (5) one or more attributes defining the modification of payloads at the endpoints of API 130. Other attributes that may be defined include parameters pertaining to services used to perform the data security operation, such as a URI of a token service.

The configuration of the API service adapter 120 may, for example, be specified in XML or JSON format, and may be a text file stored in a memory (volatile or non-volatile) of the computer system implementing the API service adapter 120. In the example of a configuration file in JSON format, the parameters discussed above may be specified as a key-value pair, where the key indicates the name of the parameter and the value indicates the value of the parameter.

The filters specified for a service may include one or more request filters, which modify API calls that are input into API 130 (e.g., the API call 142), and/or one or more response filters, which modify outputs from API 130 (e.g., the API response data 152). Each filter may, for example, include a definition of an inbound field name, a data security operation, and an outbound field name.

The inbound field name may define the name of a data field of the inbound data. The inbound data may be the API call 142 for a request filter or the API response data 152 for a response filter. The outbound field defines a name of the data field to which the inbound field of the inbound data is modified. For example, in the example illustrated in FIG. 1B, the inbound field for one output filter may be specified "pan" and the outbound field may be specified as "panSurrogate."

Thus, when the API service adapter 120 is being executed by one or more processors of the computer system implementing the API service adapter, the one or more processors may check the inbound data to determine whether it contains a field matching an inbound field name defined by any of the filters specified by the configuration file. The one or more processors may, for example, traverse through the entire set of fields in the inbound data to determine whether any of the fields has a field name specified in the configuration file. If there is such a field, then the one or more processors may apply the data security operation to content stored in the field, and rename the field according to the specified outbound field.

The data security operation may, for example, be a tokenization operation, a detokenization operation, a field masking operation, a field redaction operation (e.g., removal of the entire field or the entire content within the field), a truncation operation, an encryption operation, or a decryption operation. Other possible data security operations include the conversion of a virtual token number into a token reference ID and vice versa.

Specific settings or parameters of the data security operation may be specified in the filter type parameter, and/or other fields of the filter. The data security operation may be specified by one or more parameters of the filter. Additionally, the configuration may specify a plurality of data security operations to be applied to contents of a field.

A tokenization operation may include replacing information with a token representing the information, and storing a mapping of the data between the data and the token with a token service. A detokenization operation may include replacing a token with the information represented by the token. The configuration may specify various settings of the tokenization or detokenization operation, such as the URI of a token service, and the particular type of tokenization or detokenization.

For truncation and field masking, the configuration may specify the extent of truncation or a specific portion of field data (e.g., a range of indices of characters in a string) to be masked. For example, the filter may have a first parameter specifying the general type of operation (e.g., truncation and masking belonging to one type of operation) and a second parameter specifying the details of the operation. For example, the second parameter may be "TRUNC-FIRST6" to specify a truncation of the inbound field to the first 6 characters, or "MASK-6-X-4" to specify a masking of the first 6 up to (but not including) last 4 characters with the character "X." The masking character(s) also may be random.

Encryption and decryption operation may include encrypting or decrypting data by any suitable manner of encryption or decryption, respectively. For example, the API service adapter 120 may provide field-level RSA encryption for encrypting sensitive data during transmission so as to provide an additional layer of security on top of TLS when transmitting data over an open network like the internet. For example, field-level RSA encryption may be used with tokenization to convert from an encrypted PAN to a Turing token.

In order to implement encryption and decryption operations, the API service adapter 120 also may be capable of encryption key exchange. The API service adapter 120 may, for example, have a "handshake" mechanism for dynamically exchanging public keys over an open network as an alternative to static exchange mechanisms like emailing certificates.

For example, to perform RSA encryption on sensitive information received from client 110, the API service adapter 120 may receive a request from the client 110 requesting a current RSA public key. The API service adapter 120 may return the public key (encrypted or non-encrypted) and a key name to the client 110. The key name may be included in the API call 142 and, based on the key name, the API service adapter 120 may encrypt various data fields of the API call 142.

In order for the API service adapter 120 to perform RSA encryption on sensitive information included in API response data 152, the API service adapter 120 may use the RSA public key in the above scenario. The API service adapter 120 may instead request a public key from the client 110. For example, the client 110 may access or generate an RSA keypair, and include the public key (encrypted or non-encrypted) in the API call 142. The API service adapter 120 may then encrypt various data fields of the API response data 152 with the public key. The encrypted data, sent in the modified API response data 154, may then be decrypted by the client 110 using its private key.

Figure 2A:
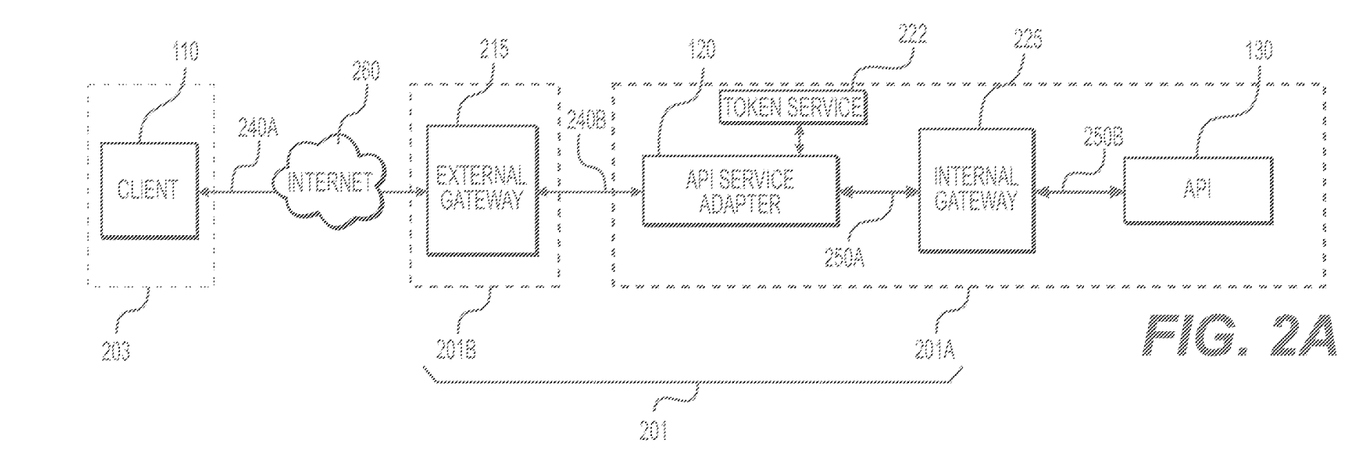
FIGS. 2A and 2B depict example topologies for the client-server environment of FIG. 1A, according to one or more embodiments.
Figure 2B:
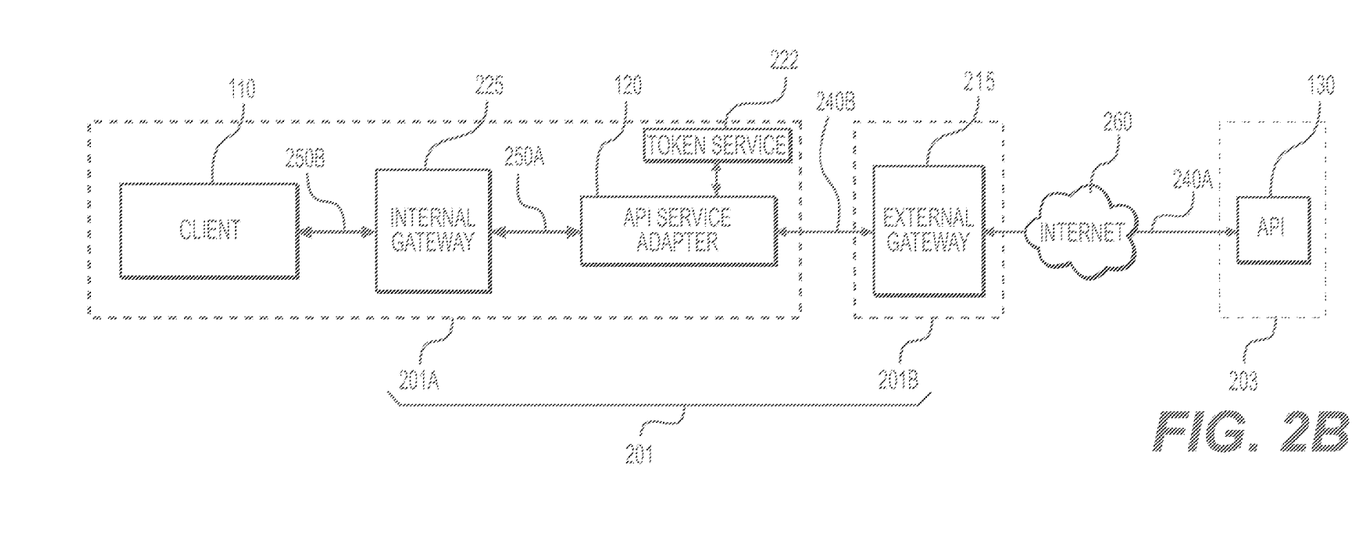

FIGS. 2A and 2B illustrate two respective topologies for the client-server environment of FIG. 1A.

FIG. 2A illustrates a first exemplary topology. In this topology, the API service adapter 120 and the API 130 are part of a restricted network 201, while the client 110 is part of an external network 203. Restricted network 201 and external network 203 also may be respectively referred to as a restricted computer system and an external computer system.

In the example of payment card industry (PCI) networks, the topology of FIG. 2A may be utilized where a non-PCI client is consuming a PCI service. For example, the restricted network 201 may be a cardholder data environment (CDE) comprising a first portion 201A and a second portion 201B. The first portion 201A may comprise "Category 1" system components, including system components that process, store, or transmit cardholder data. The second portion 201B may comprise "Category 2" system components, including system components that have controlled access to "Category 1" system components. In the CDE context, the components of external network 203 may be classified as "Category 3" system components, which are isolated from "Category 1" system components.

As shown in FIG. 2A, the client 110 and the API service adapter 120 may be in communication with one another through external gateway 215, while the API 130 and the API service adapter 120 may be in communication with one another through internal gateway 225. Additionally, a connection 240A between the external gateway 215 and the client 110 (and other components of the external network 203) may be through a public network such as the internet 260, while the connections 240B, 250A, and 250B may be connections within the restricted network 201. External gateway 215 and internal gateway 225 may, for example, be API gateways implemented by Apigee or Amazon API Gateway.

In the topology of FIG. 2A, messages sent between the client 110 and the API service adapter 120 may include data representing certain information (e.g., PAN) in a first type of security format, while messages sent between the API service adapter 120 and the API 130 may include data representing the same information in a second type of security format. For example, unencrypted plaintext may be one type of security format, while a token representation may be another type of security format. Therefore, the API service adapter 120 may serve the role of converting the information (e.g., PAN) between one security format and another security format.

As shown in FIG. 2A, the API service adapter 120 may have access to a token service 222 for purposes of performing tokenization or detokenization. The token service 222 may, for example, store or otherwise have access to a mapping between tokens and PANs, and provide the corresponding PAN to the API service adapter 120 in response to receiving a token from the API service adapter 120. The token service 222 may, for example, be a token server having a database storing the aforementioned information.

An example to illustrate the topology shown in FIG. 2A and the interaction between its components is provided as follows. In this example, the API 130 is as an API that inputs and outputs PANs only in the form of unencrypted plaintext, while the client 110 is a client that requires PANs to be tokenized for purposes of communicating with the restricted network 201. With the benefit of the API service adapter 120, the client 110 may send, to the API service adapter 120, an API call 142 that includes a tokenized PAN as an input parameter (e.g., as a content of a data field of the API call 142). The API service adapter 120 may convert the token into a PAN. To make this conversion, the API service adapter 120 may utilize token service 222. The token service 222 provide the corresponding PAN to the API service adapter 120 in response to receiving a token from the API service adapter. The API service adapter 120 then modifies the API call 142 into a modified API call 144 by converting the token in the API call 142 to a PAN, and sends the PAN to the API 130. The API 130 then returns API response data 152 to the API service adapter 120, which then modifies the API response data 152 into modified API response data 154 by converting the PAN into a token (by, for example, using the token service 222), before sending the modified API response data 154 to the client 110.

Accordingly, as illustrated by the above example, the deployment model of FIG. 2A allows the calling of a service provided by the API 130 that exposes PAN from a client 110 of another network. The client 110 thus consumes the rewritten (tokenized) service passed through the external gateway 215, and the API service adapter 120 thus consumes the PAN-exposing service passed through the internal gateway 225.

Another example to illustrate the topology shown in FIG. 2A and the interaction between its components is provided as follows. In this second example, the server 132 operates an API 130 that returns the balance and recent transactions of a credit card. In order to reduce the amount of sensitive information inside the restricted network 201, the API 130 in this example requires a token representation of a PAN in order to process the query requesting the balance and recent transactions. Additionally, the token is internal to the restricted network 201.

Therefore, in order for a client 110 of the external network 203 to query for the balance and recent transactions of a credit card, the API service adapter 120 may convert the PAN (e.g., 4400000000001111) of an incoming API call 142 from the client 110 to a corresponding token (e.g., 440000abcdef1111). The API service adapter 120 calls the API 130 using the token as a modified API call 144. The API service adapter 120 then retrieves, from the API 130, an API response data 152 including the balance and recent transactions of the credit card, and the token corresponding to the PAN. Since the token is internal to the restricted network 201, the API service adapter 120 converts the token back to the PAN, and sends modified API response data 1 including the PAN together with the balance and recent transactions of the credit card.

FIG. 2B illustrates a second exemplary topology. FIG. 2B differs from FIG. 2A in that the client 110 and the API 130 have switched places, relative to their positions in FIG. 2A. That is, in FIG. 2B, client 110 is now part of the restricted network 201, while the API 130 is part of the external network 203. Any of the features of the restricted network 201, the external network 203, and other components discussed above for FIG. 2A, also may apply to like components (e.g., components having the same reference character denotation) in FIG. 2B. For example, the connection 240A in FIG. 2B may be through a public network, such as the internet 260, while the other connections (e.g., 240B, 250A, and 250B) may be through the restricted network 201.

In the example of payment card industry (PCI) networks, the topology of FIG. 2B may be utilized where a PCI client is consuming a non-PCI service. As an example to illustrate the topology of FIG. 2B, the client 110 in FIG. 2B may be a client that inputs and outputs PANs only in unencrypted plaintext format. The client 110 may request data from the API 130, but the API 130 in this example requires an input of PAN in tokenized form in order to provide the data desired by the client 110, and additionally outputs PAN in tokenized form together with the desired data. Therefore, with the benefit of the API service adapter 120, the client 110 may send an API call 142 (containing PAN in unencrypted plaintext format) to have it processed by the API service adapter 120 into a modified API call 144 (in which the PAN is tokenized). The API service adapter 120 then sends the modified API call 144 to the API 130, which returns an API response data 152 including a tokenized PAN. The API service adapter 120 detokenizes the PAN, and sends the modified API response data 154 to the client 110.

Figure 3:
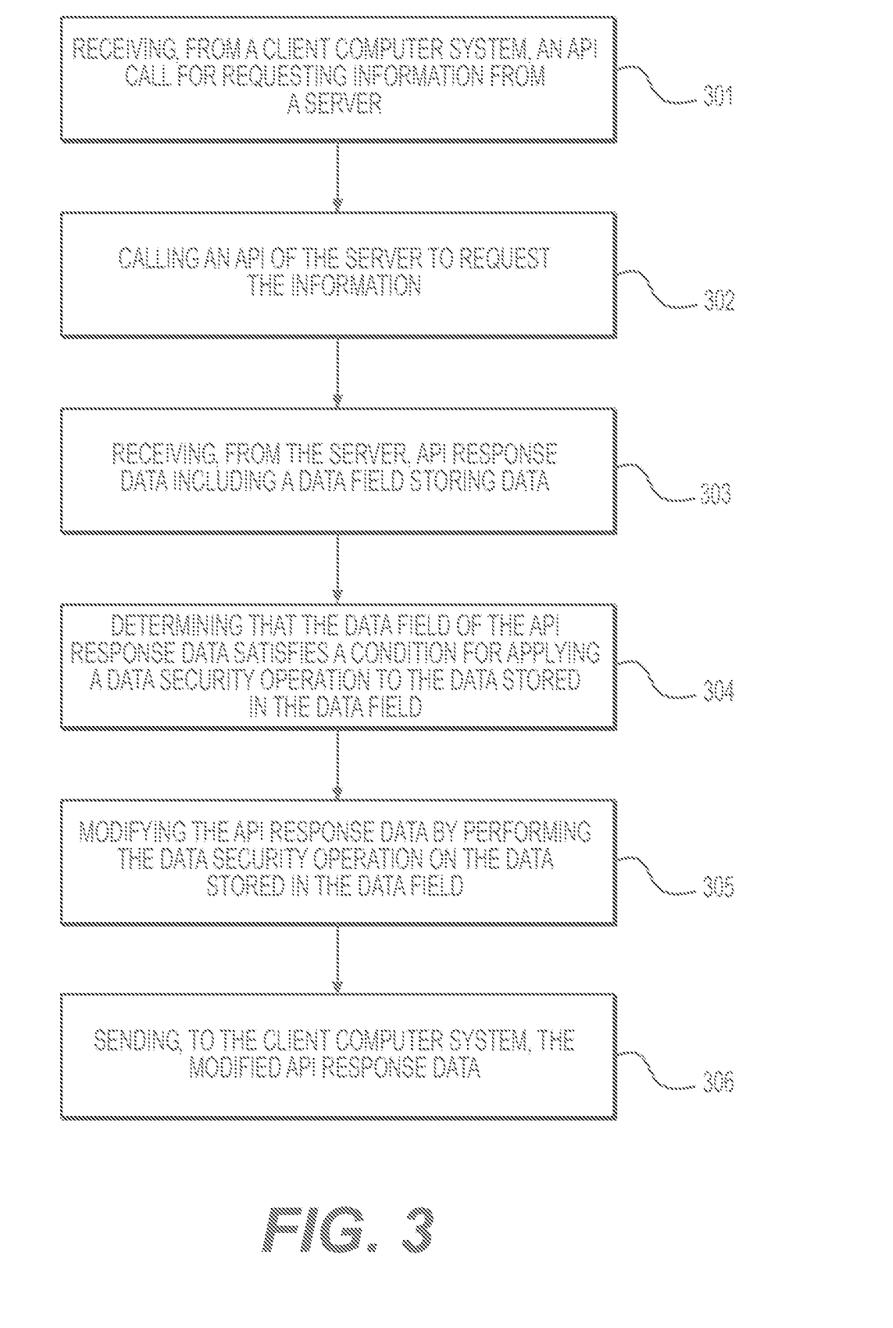
FIG. 3 illustrates a process for adapting an API by rewriting an output of the API, according to one or more embodiments.

FIG. 3 illustrates an example process for adapting an API by rewriting an output of the API, according to one or more embodiments of the present disclosure. The process may be performed by one or more processors of a computer system implementing the API service adapter 120 shown in FIG. 1A. The process of FIG. 3 includes the following: receiving, from a client computer system, an API call for requesting information from a server (step 301); calling an API of the server to request the information (step 302); and receiving, from the server, API response data including a data field storing data indicating the information (step 303). The data that is stored in the data field of step 303 may be data indicating the information (which may be sensitive information) that was requested by the API call in step 301 or some other information (which may be sensitive information) that is returned in the API response data. Data indicating a certain information may depict that information in unencrypted plaintext format, or in a processed (e.g., encrypted or tokenized) format.

The process illustrated in FIG. 3 further includes: determining that the data field of the API response data satisfies a condition for applying a data security operation (step 304). The condition in this step may be having a field name specified in configuration data stored in a memory of a computer system. The process illustrated in FIG. 3 further includes: modifying the API response data by performing the data security operation on the data stored in the data field (step 305); and sending, to the client computer system, the modified API response data (step 306).

An example to illustrate the process shown in FIG. 3 is presented as follows, with reference to components shown in FIG. 1. In this example, the server 132 is operating an API 130 that receives an input of an account number (e.g., 11321234432423) and returns a list of PANs (e.g., credit card numbers) associated with that account number (e.g., PANs belonging to an account identified by the account number). Additionally, in this example, the API 130 returns all digits of PANs in unencrypted plaintext format, but the client 110 (client computer system) only needs the last four digits of the PAN.

The client 110 sends an API call 142 to a URL associated with the API service adapter 120. The API call 142 may include the account number in a data field of the API call 142, as well as information indicating that it is a request for a list of PANs. A reverse proxy server implementing the API service adapter 120 may be listening to the URL. While listening to this URL, the reverse proxy server intercepts the API call 142, so as to receive the API call (in accordance with step 301 of FIG. 3).

In calling the API 130 to request the PANs (in accordance with step 302 of FIG. 1), the reverse proxy server may generate a new API call 144 containing the address of the server 132, which may be an address that is inaccessible by the client 110. Depending on the specifics of the implementation, the payload of the new API call 144 may be the same or modified from the payload of API call 142. In some implementations, the reverse proxy server also may alter the format of the API call 142, and/or any of its fields and their payloads.

After sending the API call 144 to the server 132, the reverse proxy server receives API response data 152 including a data field storing the two PANs associated with the account number (in accordance with step 303 of FIG. 3). For example, the API response data 152 may include a JSON object as follows: {"pan": ["4400000000001111", "4400000000001112"], "acct": "11321234432423"}. That is, in the above example, the API response data 152 includes a field named "pan" storing the two PANs as an array of two numbers.

In accordance with step 304 of FIG. 3, the reverse proxy server may determine that the field name "pan" matches a list of field names stored in configuration data in association with a security operation to be performed on content stored in any field having the field name "pan." The configuration data specifies that the security operation to be performed is a field masking operation, in which all characters other than the last four characters are to be masked (e.g., hidden). Therefore, in accordance with step 305 of FIG. 3, the reverse proxy server modifies the API response data 152 by changing the value of the key-value pair to: ["**********1111", "**********1112"]. The configuration data also may specify that the field name "pan" be changed to "maskedpan," and the field name may be changed accordingly.

Then, in accordance with step 306 of FIG. 3, the modified API response data 154 is sent to the client computer system (client 110). In this example, the modified API response data 154 includes the following JSON object in place of the above JSON object: {"maskedpan": ["**********1111", "**********1112"], "acct": "11321234432423"}.

According to the above example, API service adapter 120 adapts the output of the API 130 so as to avoid an unnecessary exposure of the full PANs when the client 110 does not need the full PANs.

Figure 4:
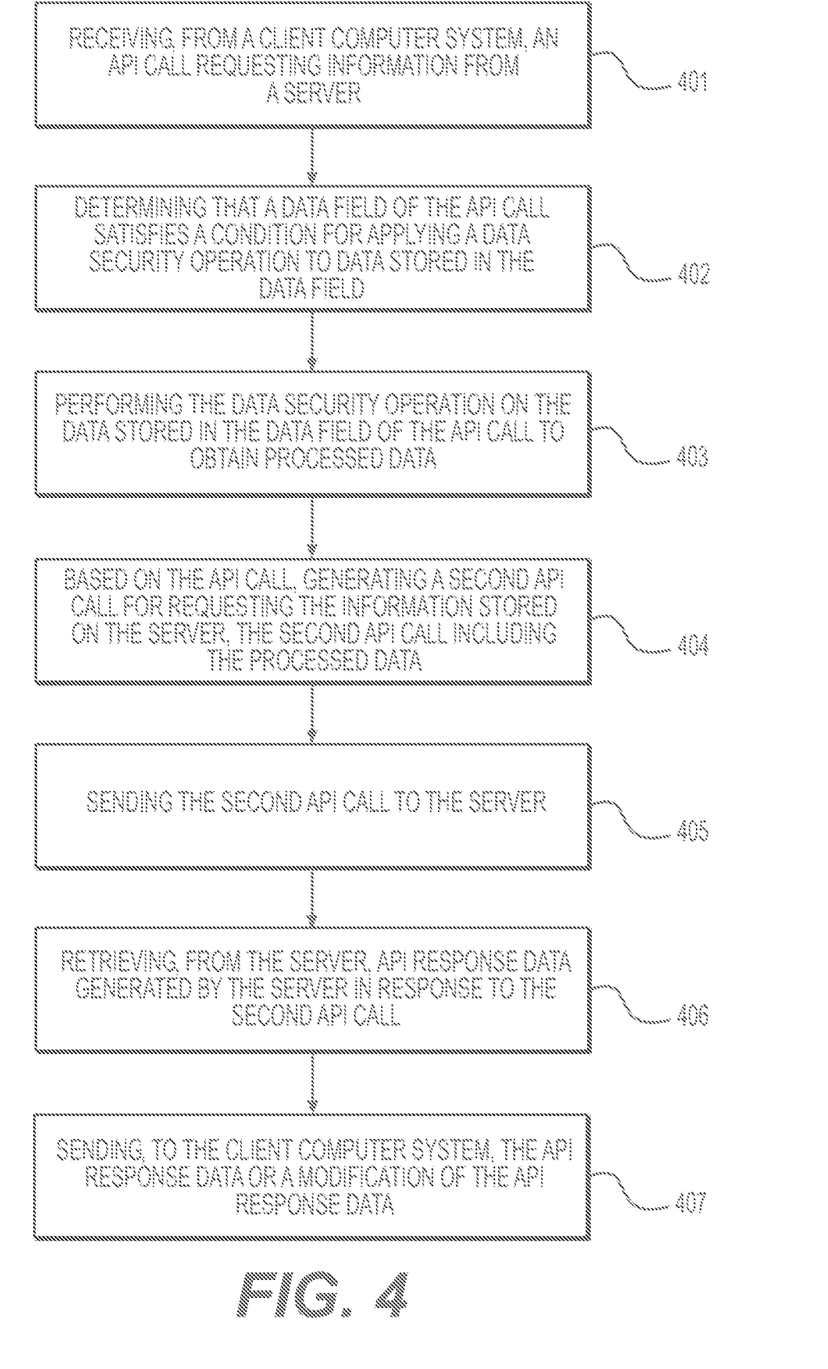
FIG. 4 illustrates a process for adapting an API by rewriting an input of the API, according to one or more embodiments.

FIG. 4 illustrates an example process for adapting an API by rewriting an input of the API, according to one or more embodiments the present disclosure. The process may be performed by one or more processors of a computer system implementing the API service adapter 120. The process includes: receiving, from a client computer system, an API call requesting information from a server (step 401); determining that a data field of the API call satisfies a condition for applying a data security operation to data stored in the data field (step 402); performing the data security operation on the data stored in the data field of the API call to obtain processed data (step 403); based on the API call, generating a second API call for requesting the information stored on the server, the second API call including the processed data (step 404); sending the second API call to the server (step 405); retrieving, from the server, API response data generated by the server in response to the second API call (step 406); and sending, to the client computer system, the API response data or a modification of the API response data (step 407).

Figure 5:
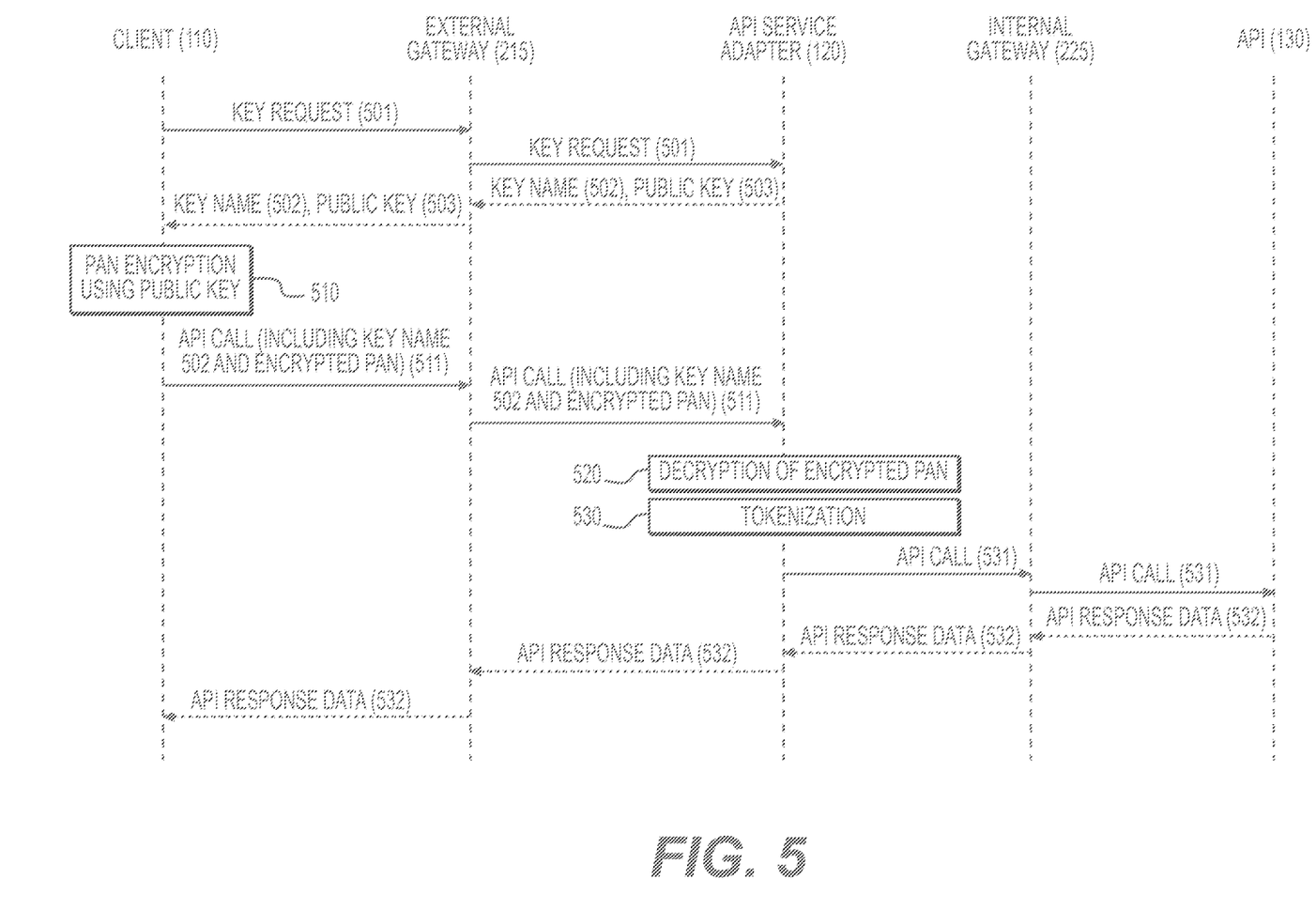
FIG. 5 illustrates an example of a process in which decryption is performed on information received from a client computer system, according to one or more embodiments.

FIG. 5 illustrates an example process in which decryption is performed on information received from a client computer system. The process illustrated in FIG. 5 may be considered to be an example implementation of the general process shown in FIG. 4. As shown in FIG. 5, the client 110 sends a key request (501) to the API service adapter 120. Client 110 may be any system that performs the interactions shown in FIG. 5. For example, in a payment card industry application, client 110 may be an interactive voice response (IVR) system, such as an IVR system that provides a credit card activation service allowing customers to activate a credit card by telephone. In response to receiving key request 501, the API service adapter 120 generates a private key, a public key 503, and a key name 502 used to identify the private key. The API service adapter 120 stores the private key and the key name 502 in a data storage or memory of the computer system implementing the API service adapter 120, and sends the key name 502 and public key 503 to the client 110. The client then uses the public key to encrypt a PAN. Using the encrypted PAN, the client 110 sends an API call 511 that includes the encrypted PAN in a certain field identifiable by the API service adapter 120, as well as the key name 502. The API call 511 is received by the API service adapter 120, in accordance with step 501 of FIG. 4. The API call 511 of FIG. 6, including an encrypted PAN and the key name 502, is an example of API call 142 of FIG. 1.

After receiving the API call 511, the API service adapter 120 determines that the field storing the encrypted PAN satisfies a condition for applying a decryption operation to data stored in the field, in accordance with step 402 of FIG. 4. The API service adapter 120 then decrypts the encrypted PAN by selecting the private key using the key name, and using the private key (step 520 of FIG. 6; step 403 of FIG. 5). Optionally, the API service adapter 120 performs tokenization of the decrypted PAN (step 530 of FIG. 6), if the API service adapter 120 has been configured to do so. The process of FIG. 6 then proceeds with the API service adapter sending an API call 531 to the API 130 using the decrypted (and optionally tokenized) PAN, and receiving an API response data 532 from the API 130 of the server 132, in according with the remaining steps of FIG. 4.

According to the methods and systems of this disclosure, an existing API may be adapted by using an API service adapter 120 that rewrites the input and outputs of the existing API 130. Therefore, the API service adapter 120 provides a "bolt-on" adapter that can adapt the existing API 130 to various security formats and security requirements for the input and output of the API 130.

Implementation of the API service adapter 120 allows existing assets to be leveraged against new security or compliance requirements, so as to avoid the need to rewrite the existing API and to avoid disruption to clients that are already using the existing API. Furthermore, implementation of the API service adapter 120 externalizes some of the more sensitive security considerations from business applications in a way that encourages consistency, shields technology assets from ongoing remediation requirements, and provides a turn-key solution for increasing the security of an existing API 130.

In general, any process discussed in this disclosure that is understood to be performable by a computer may be performed by one or more processors. Such processes include, but are not limited to: the processes shown in FIGS. 3-5; and processes involving operations of the client 110, the API service adapter 120, the API 130, and the server 132. The one or more processors may be configured to perform such processes by having access to instructions (computer-readable code) that, when executed by the one or more processors, cause the one or more processors to perform the processes. The one or more processors may be part of a computer system (e.g., one of the computer systems discussed above) that further includes a memory storing the instructions. The instructions also may be stored on a non-transitory computer-readable medium. The non-transitory computer-readable medium may be separate from any processor. Examples of non-transitory computer-readable media include solid-state memories, optical media, and magnetic media.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method for adapting an application programming interface (API), the computer-implemented method comprising:

receiving, from a client computer system, a request for information in a first type of security format;
identifying a security format requirement of the API associated with a server;
determining the first type of security format is different from the security format requirement of the API;
querying a remote server having a database of security format types for a mapping of the first type of security format to the security format requirement of the API;
translating, using the mapping of the first type of security format to the security format requirement of the API, the request for information into a translated request having the security format of the API;
transmitting the translated request to the API;
receiving, from the API, API data responsive to the translated request; and
sending, to the client computer system, the API data.

2. The computer-implemented method of claim 1, wherein translating the request for information includes performing a tokenization operation, a field masking operation, a field redaction operation, a truncation operation, or an encryption operation.

3. The computer-implemented method of claim 1, wherein translating the request for information includes performing a detokenization operation or a decryption operation.

4. The computer-implemented method of claim 1, wherein the remote server generates the mapping of the first type of security format to the security format requirement of the API in response to being queried.

5. The computer-implemented method of claim 1, wherein data stored in a data field of the API data includes information responsive to the request for information.

6. The computer-implemented method of claim 1, wherein data stored in a data field of the API data includes an account number or a personal identifier.

7. The computer-implemented method of claim 1, wherein:
the request for information is a first request for information, and
transmitting the translated request to the API comprises:
based on the first request for information, generating a second request for information; and
sending the second request for information to the server.

8. The computer-implemented method of claim 7, wherein:
the first request for information includes a token representing a primary account number;
the computer-implemented method further comprises converting the token into the primary account number, after receiving the first request for information; and
the second request for information includes the primary account number converted from the token.

9. The computer-implemented method of claim 1, wherein:
the computer-implemented method further comprises, prior to receiving the request for information from the client computer system, sending a public key to the client computer system, the public key having a corresponding private key;
data stored in a data field of the request for information includes a data element encrypted using the public key; and
translating the request for information includes performing a decryption operation using the corresponding private key.

10. A computer system for adapting an application programming interface (API), the computer system comprising:
a memory storing instructions; and
one or more processors configured to execute the instructions to perform operations including:
receiving, from a client computer system, a request for information in a first type of security format;
identifying a security format requirement of the API associated with a server;
determining the first type of security format is different from the security format requirement of the API;
querying a remote server having a database of security format types for a mapping of the first type of security format to the security format requirement of the API;
translating, using the mapping of the first type of security format to the security format requirement of the API, the request for information into a translated request having the security format of the API;
transmitting the translated request to the API;
receiving, from the API, API data responsive to the translated request; and
sending, to the client computer system, the API data.

11. The computer system of claim 10, wherein translating the request for information includes performing a tokenization operation, a field masking operation, a field redaction operation, a truncation operation, or an encryption operation.

12. The computer system of claim 10, wherein translating the request for information includes performing a detokenization operation or a decryption operation.

13. The computer system of claim 10, wherein the remote server generates the mapping of the first type of security format to the security format requirement of the API in response to being queried.

14. The computer system of claim 10, wherein data stored in a data field of the API data includes information responsive to the request for information.

15. The computer system of claim 10, wherein data stored in a data field of the API data includes an account number or a personal identifier.

16. The computer system of claim 10, wherein:
the request for information is a first request for information, and
transmitting the translated request to the API comprises:
based on the first request for information, generating a second request for information; and
sending the second request for information to the server.

17. The computer system of claim 16, wherein:
the first request for information includes a token representing a primary account number;
the operations further include converting the token into the primary account number, after receiving the first request for information; and
the second request for information includes the primary account number converted from the token.

18. The computer system of claim 10, wherein:
the operations further include, prior to receiving the request for information from the client computer system, sending a public key to the client computer system, the public key having a corresponding private key;
data stored in a data field of the request for information includes a data element encrypted using the public key; and translating the request for information includes performing a decryption operation using the corresponding private key.

19. A computer-implemented method for adapting an application programming interface (API), the computer-implemented method comprising:
- receiving, from a client computer system, a request for information from a server;
- determining the request for information is of a first type of security format;
- identifying a security format requirement of the API associated with the server;
- comparing the first type of security format of the request for information with the security format requirement of the API and determining the first type of security format is different from the security format requirement of the API;
- accessing a remote server having a database of security format types;
- querying the remote server;
- generating, at the remote server, a mapping of the first type of security format to the security format requirement of the API;
- translating, using the mapping of the first type of security format to the security format requirement of the API, the request for information into a translated request having the security format of the API;
- transmitting the translated request to the API;
- receiving, from the API, API data responsive to the translated request; and
- sending, to the client computer system, the API data.

20. The computer-implemented method of claim 19, wherein translating the request for information includes performing a tokenization operation, a field masking operation, a field redaction operation, a truncation operation, or an encryption operation.

\* \* \* \* \*